J. M. BROWN.
Implement for Moving Cars.

No. 225,336.  Patented Mar. 9, 1880.

UNITED STATES PATENT OFFICE.

JOSEPH M. BROWN, OF YORK, NEBRASKA.

IMPLEMENT FOR MOVING CARS.

SPECIFICATION forming part of Letters Patent No. 225,336, dated March 9, 1880.

Application filed August 18, 1879.

*To all whom it may concern:*

Be it known that I, JOSEPH M. BROWN, of York, in the county of York and State of Nebraska, have invented certain new and useful Improvements in Implements for Moving Cars; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to that class of tools employed in moving cars for short distances, which movement becomes necessary in loading and unloading at grain-elevators, and frequently in the working of railway rolling-stock when neither engines nor animal-power are at the moment available. Various implements have been devised for the purpose of performing this duty; but most of them have been very inconvenient in use on account of their weight, which made them difficult to handle, and their intricacy of construction, which caused frequent breakages, although they were generally effective when in place. The device hereinafter described is believed to remedy these defects, being light, and therefore easily handled, and so simple in construction and operation as to obviate danger from breakage or difficulty in working by the most ignorant employés.

The invention consists, essentially, in a bar provided at one end with a pair of hooked plates, which encircle the car-axle, and a spring-operated pawl that bites into the axle and enables the power of the operator to be employed in producing its rotation.

Figure 1:
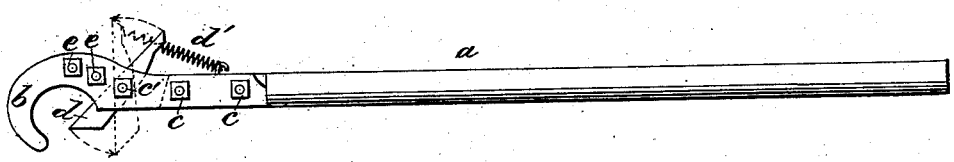
Figure 2:
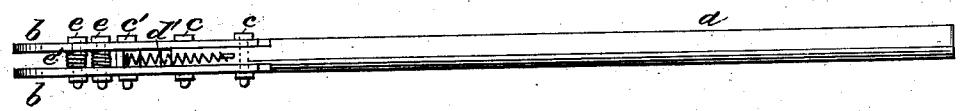
Figure 3:
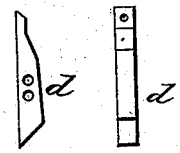

In the accompanying drawings, Figure 1 is a side view of the tool complete. Fig. 2 is an edge view of the same. Fig. 3 presents a side and edge view of the pawl.

The bar $a$ is of any desired length and diameter, and may be made tubular, which form gives greater stiffness with the same weight of metal. One end of this is made flat upon opposite sides to receive the side pieces, $b\ b$. These side pieces are of the form shown in Fig. 1 of the drawings, one end of each side piece being so curved as to hook over and embrace the car-axle, while the opposite end is straight and provided with holes, through which pass the bolts $c\ c$ that secure the side pieces to the bar $a$.

The curved ends of the side pieces are retained in their relative position parallel to each other by means of bolts $e\ e$, which pass through the side pieces, and also through the thimbles $e'\ e'$ that are placed between the side pieces, and prevent their bending toward each other when the nuts upon the bolts $e$ are screwed up. Pivoted between the side pieces, $b\ b$, by means of the bolt $c'$, is the pawl or dog $d$, the peculiar construction of which is clearly shown in Fig. 3. To one end of this pawl $d$ is secured a coiled spring, $d'$, which is also attached to the bar $a$, and serves to keep the edge of the pawl always in contact with the axle.

Two or more holes for the passage of the bolt $c'$ may be made in the pawl, if desired, so that its position may be changed to fit axles of varying diameters.

The operation of the implement is as follows: The workman, by pressing upon the outer end of the pawl, forces it into the position shown by dotted lines in Fig. 1 of the drawings. It is then placed over the axle, the sharp edge of the pawl, when released, biting into the periphery of the axle, while its tangential position allows it to move in one direction about the axle, but not in the opposite. It is therefore apparent that when a vibratory movement is imparted to the lever the axle will be caused to rotate in one direction, and thus force the car forward.

Having thus described my invention, I claim, and desire to secure by Letters Patent, the following:

The implement for moving cars, consisting, essentially, of the bar or lever, the parallel curved side pieces attached thereto, and the spring-acted pawl, all combined and arranged for joint operation substantially in the manner shown and described.

In testimony that I claim the foregoing I have hereunto set my hand.

JOSEPH MICHAEL BROWN.

Witnesses:
M. C. FRANK,
W. T. SCOTT.